United States Patent
Kerschbaumer et al.

Patent Number: 5,850,855
Date of Patent: Dec. 22, 1998

[54] FLEXIBLE COOLANT CONDUIT AND METHOD OF MAKING SAME

[75] Inventors: Franz Kerschbaumer, Chur; Wolfgang Pfleger, Tamins; Georg Stoeppelmann, Bonaduz, all of Switzerland

[73] Assignee: Ems-Inventa AG, Switzerland

[21] Appl. No.: 595,763

[22] Filed: Feb. 2, 1996

(Under 37 CFR 1.47)

Related U.S. Application Data

[63] Continuation-in-part of Ser. No. 119,327, Sep. 9, 1993, abandoned.

[30] Foreign Application Priority Data

Jan. 9, 1990 [DE] Germany .......................... 4 000 434.1
Jul. 18, 1995 [DE] Germany ................... 295 11 606.4 U

[51] Int. Cl.$^6$ ...................................................... F16L 9/18
[52] U.S. Cl. ......................... 138/137; 138/141; 138/121; 138/DIG. 7
[58] Field of Search ..................... 138/137, 141, 138/121, 122, DIG. 3, DIG. 7

[56] References Cited

U.S. PATENT DOCUMENTS

| | | | |
|---|---|---|---|
| 4,101,699 | 7/1978 | Stine et al. | 138/141 |
| 4,239,474 | 12/1980 | Nakagawa . | |
| 4,481,238 | 11/1984 | Fagerburg et al. | 138/141 |
| 4,905,735 | 3/1990 | Akiyoshi . | |
| 5,090,405 | 2/1992 | Jansen et al. | 138/141 |
| 5,223,571 | 6/1993 | Igarashi et al. | 138/141 |
| 5,474,109 | 12/1995 | Stoeppelmann et al. | 138/137 |
| 5,492,151 | 2/1996 | Wood et al. | 138/121 |
| 5,560,398 | 10/1996 | Pfleger | 138/121 |
| 5,588,468 | 12/1996 | Pfleger | 138/121 |
| 5,647,400 | 7/1997 | Jani et al. | 138/141 |
| 5,698,626 | 12/1997 | Chang | 524/603 |
| 5,738,864 | 4/1998 | Schacht et al. | 424/426 |
| 5,753,774 | 5/1998 | Chang | 525/327.5 |

FOREIGN PATENT DOCUMENTS

| | | |
|---|---|---|
| 0388693 | 9/1990 | European Pat. Off. . |
| 0654505 | 5/1995 | European Pat. Off. . |
| 0659535 | 6/1995 | European Pat. Off. . |
| 3319515 | 11/1984 | Germany . |
| 4214383 | 4/1992 | Germany . |
| 4215778 | 5/1992 | Germany . |
| 4214383 | 6/1993 | Germany . |
| 4310272 | 10/1994 | Germany . |
| 4434530 | 3/1995 | Germany . |
| 4404492 | 6/1995 | Germany . |

OTHER PUBLICATIONS

Copy of Geblasene Hochstleistungen article, May 1995.
Patent Abs. of Japan, vol. 014, No. 276, Jun. 14, 1990 & JP–A–02 080881 (Hitachi Cable Ltd. Mar. 20, 190.
Pat.Abs.of Japan, vol. 013, No. 236, Mar. 30, 1989 &JP–A–01 043550 (Japan Synthetic Rubber Co., Ltd.) Feb. 15, 1989.
Patent Abst. of Japan, vol. 014, No. 159, Mar. 28, 1990 & JP–A–02 022050 (Tokai Rubber Ind. Ltd.) Jan. 24, 1990.

*Primary Examiner*—Denise L. Ferensic
*Assistant Examiner*—James F. Hook
*Attorney, Agent, or Firm*—Bierman, Muserlian and Lucas

[57] ABSTRACT

A flexible conduit for coolant having a high bursting pressure above 8 bar at 100° C. and high hydrolysis resistance comprising an outer layer of a material selected from the group consisting of homopolyamides, copolyamides and mixtures thereof with an excess of amino terminal groups, a non-swelling inner layer made of a material selected from the group consisting of non-halogenated copolyolefins, non-halogenated homopolyolefins and mixtures thereof and a middle layer compatible with the inner and outer layers made of a homopolyolefin or a copolyolefin with grafted functional groups, the layers being coextruded and corrugated during coextrusion.

8 Claims, 1 Drawing Sheet

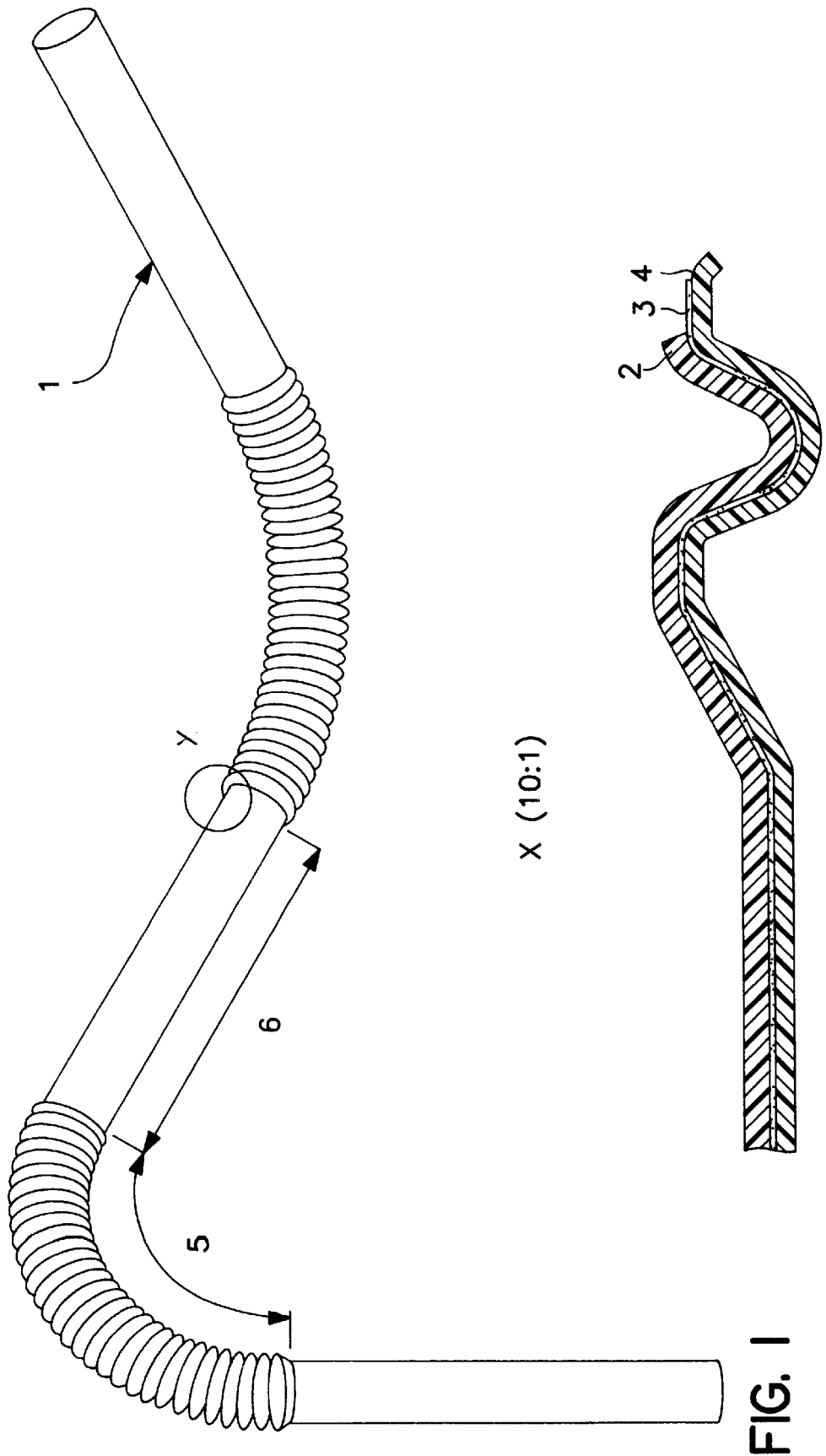

_1_

FLEXIBLE COOLANT CONDUIT AND METHOD OF MAKING SAME

PRIOR APPLICATION

This application is a continuation-in-part application of U.S. patent application Ser. No. 119,327 filed Sep. 9, 1993, now abandoned.

STATE OF THE ART

For many years, it has been known to provide flexible coolant conduits for vehicle engines of rubber reinforced with a fibrous material or fabric. Such conduits are relatively expensive and, in addition, do not fully meet the working requirements of such devices. Engines operate at high temperatures and, after only about 100,000 kilometers, the mechanical properties of such rubber conduits degrade substantially. Moreover, it is to be expected that, in the future, engines will operate at still higher temperatures, further accelerating the loss in mechanical properties of the conduits used in connection therewith.

Thus far, conduits comprising only a single layer of polymer (mono conduits) had extremely limited applications in this area. If the conduit is made of polyolefins, there was a great tendency to yield to bursting pressure, especially temperatures exceeding 100° C. Additionally, such polyolefins tend to be corroded by contact with oils and greases, thereby promoting stress cracking. Also, polyamide mono conduits are not resistant to hydrolysis engendered by the cooling fluid, especially at temperatures above 100° C. Of course,, such temperatures are often approached or exceeded by current automobile engines.

In addition, the polyamide monoconduits exhibit a substantial tendency towards swelling on contact with the coolant. In order to attempt to overcome this, glass fibers were introduced into the polyamide; however, this was used only for parts coming into direct contact with the coolant as the flexibility of the conduits is impaired thereby.

Coolant media that flow through these lines for instance can contain antifreeze agents comprising ethylene glycol, diethylene glycol or propylene glycol and water. Such liquid coolant lines can have a cylindrical jacket face but are usually corrugated at least in some regions. The liquid coolant lines of the invention are used in the entire coolant system for automobiles, or in other words for cooling lines, heating lines and ventilation lines.

Thermoplastic liquid coolant lines are already known from German Utility Models DE-GM 94 02 180.5, DE-GM 93 19 879.5, DE-GM 93 19 880.9 and German Patent Disclosure DE-A 44 32 584.3.

OBJECTS OF THE INVENTION

It is an object of the invention to provide novel flexible conduits for coolants which are resistant to the coolants and have a high resistance to bursting pressures.

It is also an object of the invention to provide a novel method of forming solid conduits.

These and other objects and advantages of the invention will become obvious from the following detailed description.

THE INVENTION

The flexible conduits of the invention for coolant having a high bursting pressure above 8 bar at 100° C. and high hydrolysis resistance comprises an outer layer of a material selected from the group consisting of homopolyamides, copolyamides and mixtures thereof, a non-swelling inner layer made of a material selected from the group consisting of non-halogenated copoly-olefins, non-halogenated homopolyolefins and mixtures thereof and a middle layer compatible with the inner and outer layers made of a homopolyolefin or a copolyolefin with grafted functional groups, the layers being coextruded and corrugated during coextrusion.

The bursting problem is solved by the provision of conduits having a plurality of layers of polymers which are compatible with each other at least at their contacting faces whereby it is possible to obtain a combination of properties in the overall conduit which results from the properties of the individual layers. By corrugating the walls (either annularly or spirally), additional flexibility and the ability to bend in a small turning radius are achieved. Moreover, this can be accomplished without the necessity of reinforcements. Corrugation of the walls at the appropriate places permits sharp curves, even when the radii of the curvature are very small. The corrugation, which is accomplished by known methods, may be either annular or spiral.

A flexible liquid coolant line embodied in two layers, namely the inner layer is a polyolefin provided with functional groups, and the outer layer comprises polyamide selected from the group of homopolyamides or copolyamides or blends thereof has the disadvantage that conventionally polymerized polyamides have only moderate resistance to hydrolysis. Moreover, the severe strains in liquid coolant lines subjected to pressure and designed in the form of thermoplastic corrugated tubing have the effect that the graft polyolefins have a very strong tendency to stress crack in contact with antifreezes and at temperatures greater than 100° C. and therefore fail in use.

For the inner layer of thermoplastic liquid coolant lines, it is also very important that the permeation of coolant and water be as slight as possible, since these liquids damage the outer layer, which is resistant to bursting strength. Polyolefins only conditionally meet this requirement. Another disadvantage of liquid coolant lines of two layers is that the interlaminar adhesion between the polyamide and polyolefins which are grafted with functional groups is lost after coolants have flowed through them at high temperatures for relatively long periods, resulting in delamination.

Polyamides with a high proportion of amino groups have particularly good hydrolysis stability. As a result of this property, the service life of the tubes according to the invention can be markedly improved, compared with the liquid coolant line of the prior art. Cross-linked polyethylene has an extraordinarily high resistance to stress cracking in the presence of aggressive acids and in the presence of strong alkaline solutions. Moreover, high density polyethylene (HDPE) functions as an excellent water barrier, so that the polyamide outer layer with good bursting strength is well protected against the destructive action of water. The use of commercially available non-cross-linked HDPE is not possible, however, since liquid coolant lines must be acted upon by temperatures beyond the crystallite melting point, and non-cross-linked HDPE therefore melts at these temperatures. Cross-linkable HDPE does not have this disadvantage. For processing reasons, a silane-cross-linked polyethylene (PE) is to be preferred over such systems as PE cross-linked with peroxide or with radiation. Polyamides with an excess of amino terminal groups have a markedly better and stronger adhesion to polyolefins with functional side groups, such as maleic anhydride. This adhesion is not undone even over long-term attack by heat and water.

The liquid coolant lines of the invention are used in the entire cooling system of automobiles, or in other words for coolant lines, heating lines and ventilation lines. Depending on the location of use and on the task involved, the diameters of the lines according to the invention can vary. For example, the lines can have inside diameters ranging from 5 mm to 50 mm.

A very particularly preferred embodiment of the liquid coolant line of the invention comprises a polyamide 12 with an excess of amino terminal groups as the outer layer, an organosilane-grafted HDPE, as the inner layer, and a compatible intermediate layer of HDPE grafted with maleic anhydride. This preferred form of the invention includes some portions that are corrugated and other portions that are smooth or in other words not corrugated. The crosslinking takes place due to the absorption of the water.

Examples of outer layer are those made of homopolyamides or copolyamides of linear aliphatic monomers containing 6 to 12 carbon atoms. Examples of these are lactams, aminocarboxylic acids, and diamines and dicarboxylic acids. Homopolyamides or copolyamides of aromatic monomers having 6 to 12 carbon atoms are also desirable for use in the present invention. Examples of these are alkylated or non-alkylated aromatic diamines or dicarboxylic acids. Furthermore, cycloaliphatic monomers such as alkylated or non-alkylated diamines or dicarboxylic acids having one or more cyclo hexane rings have been used with more than satisfactory results. These rings can be joined via alkylene groups.

Further specific examples are the polyamides from PA 6 to PA 12 and from PA 6, 6 to PA 6,12. In addition, mention is made of PA 12, 6 to PA 12,12. Of course, mixtures of any of the foregoing are also suitable, and polyamides having viscosities in excess of 10,000 Pa.s (Pascal seconds) are especially desirable.

Examples of the intermediate layer, compatible with both the inner and outer layers, are homopolyolefins or copolyolefins with grafted reactive groups are suitable for this purpose. In particular, carboxylic or acid anhydride groups grafted onto the main molecule are especially useful. As a further desirable possibility, the comonomers mentioned above can be used.

The polymer line of the invention can be made by coextrusion of a polymer tube and optionally ensuing formation of the corrugations by blow molding or suction molding. Alternatively, the liquid coolant line of the invention can be made by coextrusion blow molding. Corrugated tubes and corrugated hoses are known in various embodiments in the industry. They may be metal or plastic. Such tubes and hoses are used in the automobile industry, among other fields.

The liquid coolant line of the invention that can be acted upon by pressure comprises three polymers layers, with polymers that are compatible with one another especially at the areas of contact of the layers. The line may be corrugated in a portion thereof and the polymer line of the invention has high flexibility, hydrolysis strength and resistance to bursting strength.

The polymers of the individual layers may be modified with process- or application-dictated additives in accordance with the prior art. Examples that can be named in particular are stabilizers, softeners, pigments and additives to improve the impact strength. The layer thicknesses of the individual layers of the embodiments according to the invention may be adapted to the demands for barrier action, bursting strength or impact strength, for instance, and vary between 0.05 mm and 3 mm.

REFERRING NOW TO THE DRAWINGS

FIG. 1 is an example of the coolant conduit of the invention and

FIG. 2 is a cross-section of the conduit of FIG. 1.

In FIGS. 1 and 2, a preferred liquid embodiment is comprised of the outer layer (2), the middle layer (3) and the inner layer (4) coaxial with one another. (5) designates the flexible region and (6) the noncorrugated, rigid region of the liquid coolant line. The outer layer (2) preferably comprises a polyamide (12) (Grilamid L22A made by EMS Chemie AG, 7013 Domat/Ems, Switzerland) with a relative solution viscosity of 2.1 in a 0.5% solution in m-cresol and a ratio of carboxyl to amino groups of approximately 0.3. The inner layer (4) comprises an HDPE with a density of 0.95 g/cm$^3$, grafted with methoxysilane. The middle layer comprises an HDPE with a density of 0.96 g/cm$^3$, grafted with maleic anhydride.

In the following example, there is described a preferred embodiment to illustrate the invention. However, it is to be understood that the invention is not intended to be limited to the specific embodiment.

The conduits of the present invention are preferably produced by coextrusion. The relevant data regarding production thereof is set forth as follows:

EXAMPLE 1

A three layer coolant conduit of the invention was prepared by coextrusion of an outer layer of polyamide 12 (Grilamid L22A) with a relative solution viscosity of 2.1 in a 0.5% solution in m-cresol and a ratio of carboxyl groups to amino groups of about 0.3, an inner layer of high density polyethylene (HDPE) with a density of 0.95 g/cm$^3$ grafted with methoxysilane and a middle layer of HDPE with a density of 0.96 g/cm$^3$ grafted with maleic anhydride. The conduit was corrugated.

Also prepared was tube No. 2 which was like tube (1) except that the outer layer was polyamide 12 (Grilamid L25H) with a relative solution viscosity of 2.3 and a ratio of carboxyl group to amino groups of about 1.0, tube No. 3 had an outer layer of polyamide 12 (Grilamid L25H) with a relative solution viscosity of 2.3 and a ratio of carboxyl to amino terminal group of about 1.0, an inner layer of PP/EPDM blend and a middle layer of polypropylene (PP) grafted with 5 weight % of maleic anhydride and tube No. 4 had an outer layer of polyamide 12 (Grilamid L25H) with a relative solution viscosity of 2.3 and a ratio of carboxyl to amino terminal groups of about 1.0 and an inner layer of polypropylene grafted with 5 weight % of maleic anhydride.

The resistance of the corrugated tubes was compared by filling the tubes with antifreeze in a 50—50 mixture of water and the tubes were then sealed. The tubes were then stored at 118° C. with a constant overpressure of 1.6 bar. The results of the tests are requested in Table 1.

TABLE 1

| Property | Storage time (h) | Tube 1 (invention) | Tube 2 | Tube 3 | Tube 4 ** |
|---|---|---|---|---|---|
| $\eta_{rel}$ in 0.5% m-cresol measured for the outer layer | 0 | 2.28 | 2.30 | 2.30 | 2.30 |
| $\eta_{rel}$ in m-cresol measured for the outer layer | 1000 | 2.34 | 2.21 | 1.92 | 1.75 |

TABLE 1-continued

| Property | Storage time (h) | Tube 1 (invention) | Tube 2 | Tube 3 | Tube 4 ** |
|---|---|---|---|---|---|
| $\eta_{rel}$ in m-cresol measured for the outer layer | 2000 | 2.03 | 1.85 | * | * |
| impact strength of the tube by the Renault standard (−30° C., 400 g weight from a height of 500 mm) | 0 | no break | no break | no break | no break |
| impact strength of the tube by the Renault standard (−30° C., 400 g weight from a height of 500 mm) | 1000 | no break | no break | break | break |
| impact strength of the tube by the Renault standard (−30° C., 400 g weight from a height of 500 mm) | 2000 | no break | no break | * | * |
| Adhesion between outer and middle layer | 0 | non-detachable | non-detachable | non-detachable | non-detachable |
| Adhesion between outer and inner layer | 1000 | non-detachable | detachable | detachable | detachable |
| Adhesion between outer and middle layer | 2000 | non-detachable | detachable | — | — |

*-Experiment terminated after 1000 hours because of failure of the tube
** = Tube 4 is equivalent to the prior art in DE-A 40 00 434

Various modifications of the conduits and method of the invention may be made without departing from the spirit or scope thereof and it is to be understood that the invention is intended to be limited only as defined in the appended claims.

What we claim is:

1. A flexible conduit for cooling having a high bursting pressure above 8 bar at 100° C. and high hydrolysis resistance comprising an outer layer of a material selected from the group consisting of homopolyamides, copolyamides and mixtures thereof with an excess of amino terminal groups, a non-swelling inner layer made of a material selected from the group consisting of non-halogenated copolyolefins, non-halogenated homopolyolefins and mixtures thereof and a middle layer compatible with the inner and outer layers made of a homopolyolefin or a copolyolefin with grafted functional groups, the layers being coextruded and corrugated during coextrusion.

2. A flexible conduit of claim 1 wherein the outer layer is polyamide 12, the inner layer is crosslinked polyethylene and the middle layer is polyethylene grafted with functional groups.

3. A flexible conduit of claim 2 wherein the outer layer is polyamide 12 with an excess of amino terminal groups, the inner layer is polyethylene crosslinked with silane and the middle layer is high density polyethylene grafted with maleic anhydride.

4. A conduit of claim 1 wherein the outer layer is 25 to 95% of the total wall thickness of the conduit.

5. The conduit of claim 1 wherein said homopolyamides and copolyamides are monomers selected from the group consisting of linear aliphatics of 6 to 12 carbon atoms, aromatics of 6 to 10 carbon atoms and cycloaliphatics of 6 to 20 carbon atoms.

6. The conduit of claim 1 wherein said outer layer is of polyamide 6 and said inner layer is of a copolyolefin having α-unsaturated dicarboxylic acids or derivatives thereof grafted thereon.

7. The conduit of claim 1 having an internal diameter greater than 5 mm.

8. The conduit of claim 1 having a wall thickness greater than 0.4 mm.

* * * * *

UNITED STATES PATENT AND TRADEMARK OFFICE
CERTIFICATE OF CORRECTION

PATENT NO. : 5,850,855
DATED : Dec. 22, 1998
INVENTOR(S) : Kerschbaumer et al.

It is certified that error appears in the above-indentified patent and that said Letters Patent is hereby corrected as shown below:

On the title page:

Change [63] to --Continuation-in-part of Ser. No. 119,327 filed Sep. 9, 1993, abandoned, which is a continuation of Ser. No. 933,005 filed Aug. 19, 1992, now abandoned, which is a continuation Ser. No. 624,641 filed Dec. 10, 1990.--

Column 1, change lines 5-8 to :
--This application is a Continuation-in-part of Ser. No. 119,327 filed Sep. 9, 1993, now abandoned, which is a continuation of Ser. No. 933,005 filed Aug. 19, 1992, now abandoned, which is a continuation Ser. No. 624,641 filed Dec. 10, 1990.--

Signed and Sealed this

Fifth Day of October, 1999

*Attest:*

Q. TODD DICKINSON

*Attesting Officer*       *Acting Commissioner of Patents and Trademarks*